US006270708B1

(12) United States Patent
Gurol

(10) Patent No.: US 6,270,708 B1
(45) Date of Patent: Aug. 7, 2001

(54) AGGLOMERATING AND DRYING APPARATUS

(75) Inventor: Ismail Macit Gurol, Seattle, WA (US)

(73) Assignee: Tamer International, Ltd., Seattle, WA (US)

( * ) Notice: Subject to any disclaimer, the term of this patent is extended or adjusted under 35 U.S.C. 154(b) by 0 days.

(21) Appl. No.: 09/512,135

(22) Filed: Feb. 23, 2000

Related U.S. Application Data

(63) Continuation-in-part of application No. 09/267,192, filed on Mar. 12, 1999, now Pat. No. 6,143,221.

(51) Int. Cl.[7] .................................................. B29B 9/00
(52) U.S. Cl. ..................... 264/117; 264/118; 425/222; 34/363; 34/368; 34/369
(58) Field of Search ................................ 264/117, 118; 425/222, 313, 308; 34/363, 361, 362, 368, 369

(56) References Cited

U.S. PATENT DOCUMENTS

| | | | |
|---|---|---|---|
| 94,308 | * | 8/1869 | Grotz . |
| 284,579 | * | 9/1883 | Towle . |
| 624,515 | * | 5/1899 | Mallinson . |
| 2,625,856 | * | 1/1953 | Alles . |
| 3,879,857 | * | 4/1975 | Neville ..................................... 34/10 |
| 4,452,661 | * | 6/1984 | Klein et al. .......................... 34/57 E |
| 4,480,535 | * | 11/1984 | Jaxmar et al. ......................... 99/476 |
| 4,528,761 | * | 7/1985 | Kolhi ....................................... 34/35 |
| 4,588,366 | * | 5/1986 | Glatt ..................................... 425/222 |
| 5,984,212 | * | 8/1999 | Andreae-Jackering ................ 241/19 |

OTHER PUBLICATIONS

Johnson and Peterson, "Agglomrization (Instantizing)," *Encycl. of Food Technology*, AVI Westport, CT, 1974.

* cited by examiner

*Primary Examiner*—Mary Lynn Theisen
(74) *Attorney, Agent, or Firm*—Christensen O'Connor Johnson Kindness PLLC

(57) ABSTRACT

Apparatus for agglomerating and drying particulate material, including an agglomerator (4) for forming and discharging wet granules of a predetermined size or smaller, and a dryer (12). The agglomerator utilizes a rotary blade assembly (100) that repeatedly impacts and cuts the wet mixture of material to be agglomerated, which is forced radially outward through the blade assembly under centrifugal and air pressure force. Wet granules pass through an annular screen (104) where they reach a predetermined maximum size. The dryer has an inlet (50) for wet granules from the agglomerator, an outlet (78) for granules having passed through the dryer, and one or more baffles (64) within the dryer defining a spiral path through which the granules pass from the dryer inlet towards the dryer outlet. The baffles are configured such that their pitch increases with distance from the dryer inlet, whereby the cross-sectional area of the spiral path increases toward the dryer outlet.

15 Claims, 8 Drawing Sheets

AGGLOMERATING AND DRYING APPARATUS

CROSS REFERENCE TO RELATED APPLICATION

The present application is a continuation-in-part of U.S. application Ser. No. 09/267,192 filed Mar. 12, 1999, now U.S. Pat. No. 6,143,221.

FIELD OF THE INVENTION

The present invention relates to agglomerating apparatus, drying apparatus, and systems including both agglomerating and drying apparatus. The invention also relates to methods for agglomerating and drying particulate materials.

BACKGROUND OF THE INVENTION

Granules are widely used in food, pharmaceutical, agricultural, paint and chemical industries. Practically every tablet we take is granulated before it is made into a tablet. Household cleaning substances, fertilizers, animal feed, sugar, salt and just about every dry item that contains multiple ingredients is used in granule form.

There are dozens of reasons why granules are used and needed. The following are four of the main ones:

1. In multi-ingredient tablet manufacturing it is important that each tablet contains the same ratio of ingredients as the overall batch, otherwise the effectiveness of every tablet will be different. The only way to avoid this problem is to convert complex powder and liquid formulas into uniform granules that contain the correct ratio of ingredients, then press the tablets from these granules. There are two criteria in manufacturing a high quality tablet. One is compressibility, which is the ability to compress the granule to bind and form a tablet. The second criterion is content uniformity which is the ability to have the same ratio of ingredients distributed throughout the entire tablet.

2. Granules flow very easily due to their uniform size and moisture level. Fine powders clog, pack or clump, and do not flow well. Process machines do not work well with powders. A solution to this problem is to convert complex powder and liquid formulas to granules.

3. Fine powders do not mix into liquids easily. Experience shows that fine particles are more difficult to mix, they clump up and float in or on top of the liquid. One solution to this problem is to convert powders into granules.

4. When multiple component mixtures are transported, due to density differences in each ingredient, heavier ones will migrate toward the bottom and lighter ones will come to the surface. To prevent this from happening, mixtures are first converted to granules.

Granules can be formed in two ways; they can be ground from a larger solid mass and then sifted to obtain the proper granule size (size reduction). This process is called Granulation. The second method is to mix the various powdered ingredients with a liquid and a binder to form larger particles (size increase). This process is called Agglomeration.

SUMMARY OF THE INVENTION

In one aspect, the present invention provides apparatus for drying particulate material, preferably granules, which includes an enclosed path through which the particulate material is conveyed in a fluidized stream. The cross-sectional area of the path, which preferably has a spiral form, increases in the direction in which the fluidized stream flows.

Preferably, the drying apparatus includes a drying chamber having an inlet for the fluidized stream of particulate material, and an outlet for the particulate material having passed through the drying chamber. A spiral path for the fluidized stream may be defined by one or more baffles fixed within an annular drying chamber. For example, a continuous spiral baffle may be provided to form a path from the drying chamber inlet towards the outlet, the pitch of the spiral increasing with distance from the inlet to give the desired increase in cross-sectional area of the path.

It has been demonstrated that a dryer of this construction can be particularly efficient, while requiring significantly less heating energy than a comparable prior art dryer of the spray or fluidized bed types. A dryer of this construction can also readily be used in a continuous process for manufacturing granules.

In another aspect, the invention provides an agglomerator apparatus including a rotary blade assembly with a plurality of blades that are configured such that, during operation of the agglomerator, material acted on by the blades is urged to follow a generally sinusoidal path relative to a plane in which the blades are rotating. This sinusoidal motion increases the volume of material impacted by the blades and hence can be beneficial to the efficiency of the agglomerating process.

To meter the size of particles generated by the agglomerator apparatus, a mesh screen or other barrier is arranged circumferentially around the rotary blade assembly, the screen or other barrier being configured to prevent the material being agglomerated escaping from the rotary blade assembly before it has been reduced to particles of a desired size or smaller. Once the particles are sufficiently small, they will tend pass through the screen or barrier as a result of centrifugal forces acting upon them, and the particles can be collected on the radially outer side of the screen or barrier to be passed to a dryer if required. Such an arrangement has been shown to give a relatively narrow distribution of granule size, with substantially no fines (3% or less).

In a preferred form, the blades of the rotary blade assembly are arranged in a circumferential array around a central hub about which they rotate in a rotary plane. The cutting edge of each blade is defined on an outer end portion of the blade and faces the direction of rotation. The radially outer end portions of adjacent blades in the circumferential direction are angled or twisted out of the rotary plane in opposite directions about respective radial axes, in alternating fashion, so that the cutting edges of adjacent blades are respectively above and below the rotary plane.

In a further aspect, the present invention provides apparatus for agglomerating and drying particulate material which comprises an agglomerator for forming and discharging wet granules of a predetermined size or smaller, and a dryer having an inlet for wet granules from the agglomerator, an outlet for granules having passed through the dryer, and one or more baffles within the dryer defining a spiral path through which the granules pass from the dryer inlet towards the dryer outlet. The agglomerator and/or the dryer may include one or more of the features discussed above.

In yet another aspect, the present invention provides a method of drying particulate material in which the material is conveyed in a fluidized stream through an enclosed path, preferably a spiral path, which increases in cross-sectional area in the direction in which the fluidized stream flows.

The invention also provides, in a still further aspect, a method of agglomerating a particulate material which includes urging the material to follow a sinusoidal path within a rotary blade assembly during agglomeration.

Also provided by the invention is a method of preparing granules, in which a mixture is formed of particulate material and a liquid. The mixture is fed into an agglomerator and agglomerated to form granules of a predetermined size or smaller, and the granules are dried by passing them through an expanding, preferably spiral, path.

The present invention also provides a method and system for agglomerating powdered materials and liquid, that is particularly well suited for forming agglomerated material using only a very small amount of water or other liquid, and for agglomerating organic powdered materials. The powdered material is initially chilled, and the liquid (e.g., water) is evaporated to form a vapor. The warm vapor is then introduced to the chilled powder while the powder is agitated, causing the vapor to uniformly condense on the chilled powdered material for even distribution.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
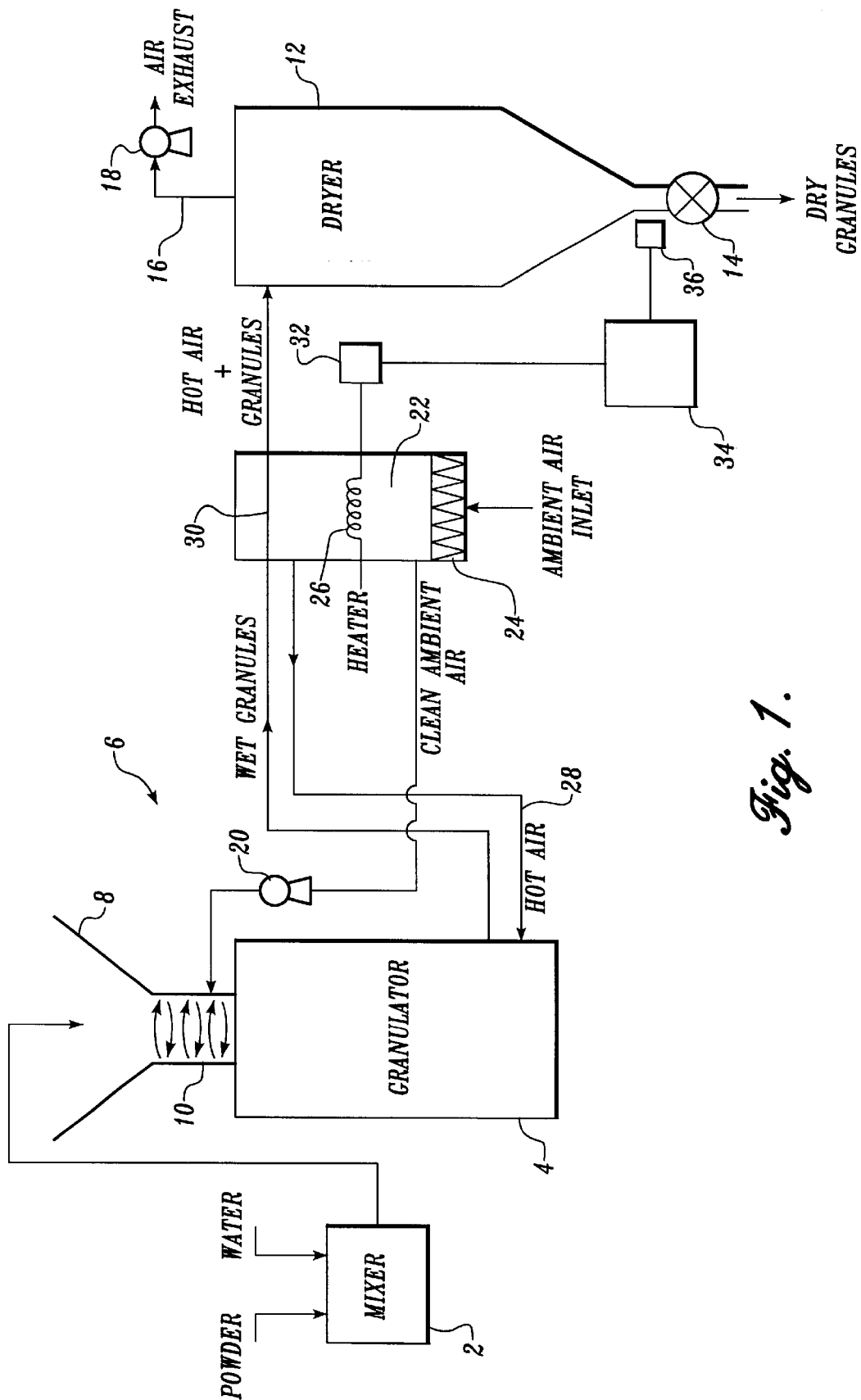
FIG. 1 schematically illustrates a system for producing granules in accordance with an embodiment of the present invention.

FIG. 1 illustrates a system for agglomerating and drying particulate material. The system includes a mixer 2 in which the desired formulation of powders are mixed with water, or another suitable binder, to form a dough. Dough from the mixer 2 is passed to an agglomerator 4. The agglomerator 4 has a feeder head 6, which includes a hopper 8 into which the dough is loaded and an auger 10 which feeds the dough from the base of the hopper 8 into the agglomerator 4 itself. In the agglomerator 4, the dough is broken down into granules of a predetermined desired size or smaller, and the granules are then fed to a dryer 12. The granules are dried in the dryer 12 and collect at the base of the dryer 12 where they can be discharged through a discharge valve 14. Moisture that has been driven out of the granules during the drying process is exhausted through an air exhaust 16 at the top of the dryer, with the aid of a vacuum pump 18 which draws a negative pressure on the air exhaust 16.

For reasons explained below, it is desirable to inject air into the inlet of the agglomerator 4 under a positive pressure. Thus, a pump 20 is provided to supply filtered ambient air to the agglomerator inlet from an air inlet plenum 22 which receives ambient air through a filter 24. The filter 24 and plenum 22 also supply heated air to both the agglomerator 4 and the dryer 12 to aid the drying of the granules. Air from the filter 24 and plenum 22 thus passes through a heater 26. From the heater 26, one stream 28 of hot air is fed to the agglomerator 4 and another stream 30 of hot air is introduced to the granules as they are fed from the agglomerator 4 to the dryer 12.

The amount of heat imparted to these hot air streams 28, 30, in particular the hot air stream 30 introduced to the path between the agglomerator 4 and the dryer 12, has a significant influence on the dryness of the granules discharged from the dryer 12. Consequently, in the preferred embodiment, a power control 32 for the heater 26 is used along with an automated adaptive controller 34, to control the power to the heater 26, and hence the heat imparted to the hot air streams 28, 30. Specifically, the heat is controlled in response to the final moisture content of the granules exiting at the base of the dryer 12. The moisture content of the granules can be measured, for example, using a microwave moisture detector 36, or other, preferably non-intrusive, detectors. The use of such a control mechanism enables the system to be used to consistently produce granules of a selected, desired moisture content to ensure the granules do not break apart or clump.

Figure 2:
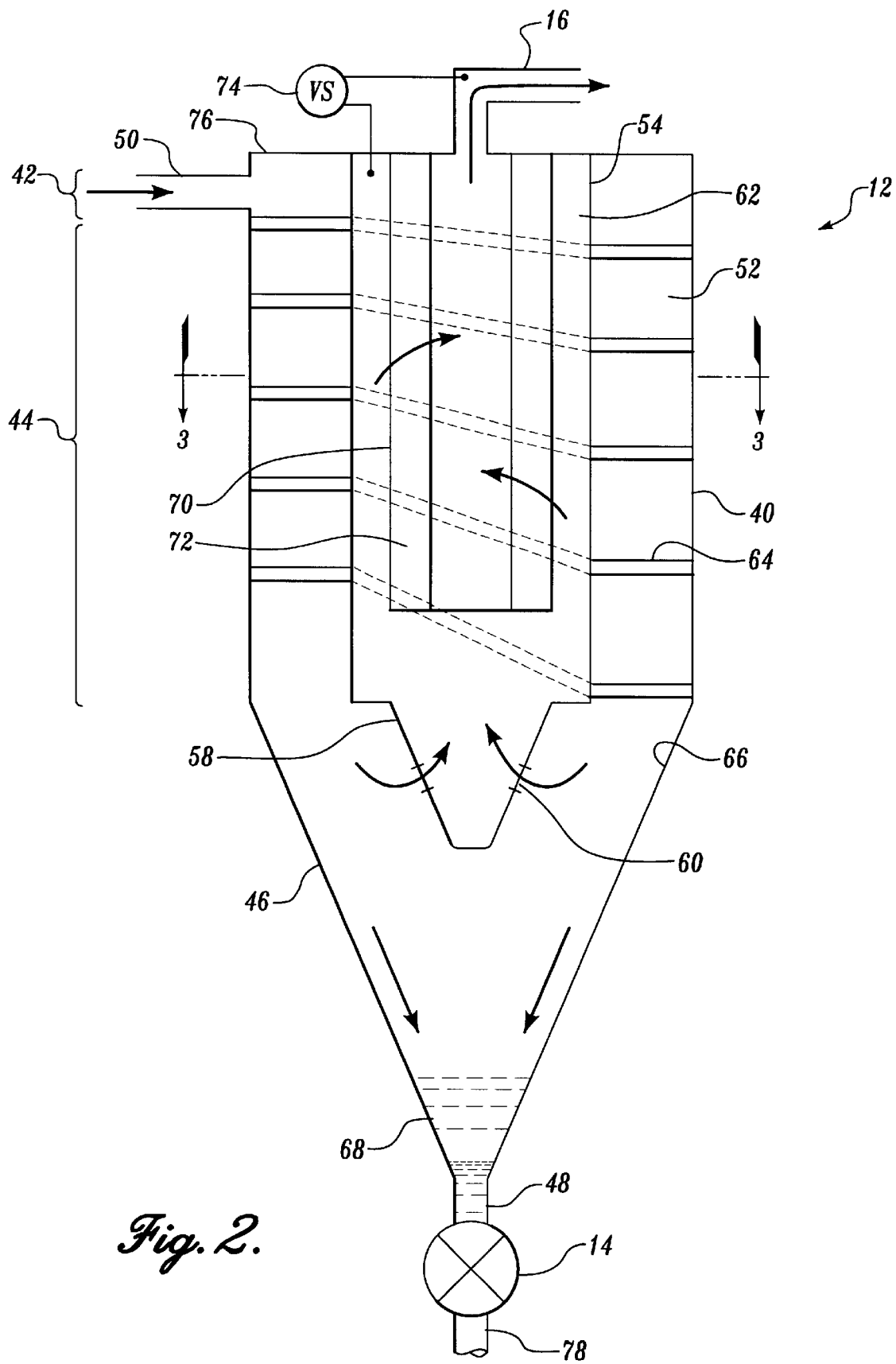
FIG. 2 is a schematic cross-sectional side view of the dryer of FIG. 1 sectioned along the longitudinal axis thereof.
Figure 3:
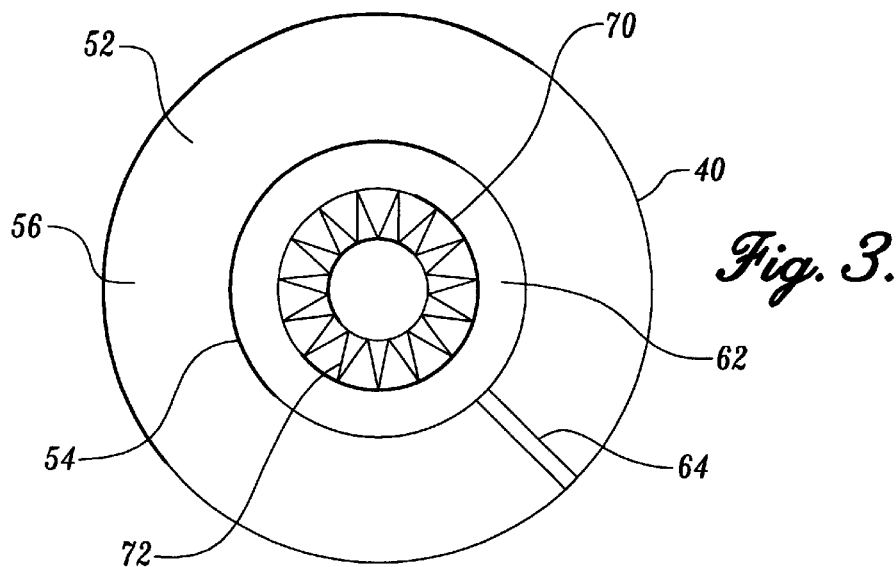
FIG. 3 is a schematic cross-sectional plan view of the dryer of FIG. 2, sectioned on 3—3.

With reference to FIGS. 2 and 3, the dryer 12 is now described in greater detail. The main structure of the dryer 12 is formed from a cylindrical tower 40 having a top portion having a constant, circular cross section (seen in FIG. 3), and a frustoconical bottom portion 46 that tapers downwardly towards a granule outlet 48 at the base of the dryer tower. "Wet" granules (typically having a moisture content of about 18% by weight, by way of example) enter the tower through an inlet 50 in an upper end of the top portion 42, carried by the hot air stream 30 in a fluidized stream. The fluidized stream of granules follows a spiral path 52 downwardly through the top portion 44 of the tower 40 and then fall into the conical, bottom portion 46, where the "dry" granules are collected. The term "dry" here is used to refer to granules that have passed through the drying tower, rather than particles that necessarily have a 0% moisture content. In fact, to ensure that the granules remain bound, their moisture content after drying will suitably be in the range 5%–10% or as otherwise selected.

A central, tubular core 54, of a circular cross section, extends coaxially with the tower through the top portion 44 thereof. The core 54 has an outside diameter significantly smaller than an internal diameter of the tower 40, forming an annular cavity 56 between the wall of the tower 40 and the core 54. A bottom end of the core 54 has a conical projection 58 which protrudes downwardly into the lower portion 46 of the tower. The conical projection 58 has one or more openings 60 therein to allow air to pass from the bottom portion 46 of the tower upwardly into the core 54, but otherwise the core 54 is closed off from the interior of the tower 40.

The core 54 extends all of the way to the top of the tower 40 to fluidly connect with the air exhaust 16, which exhausts air from the core 54. Thus, the central core defines an exhaust duct 62 for taking air from the lower portion 46 of the tower, carrying the air up through the center of the tower 40, and exhausting it at the top of the tower 40, leaving the dry granules at the base of the tower 40. To aid this exhausting of the air, a vacuum pump 18 is suitably coupled in-line to the air exhaust (see FIG. 1) to draw a negative pressure on the exhaust duct 62.

The drawing of a negative pressure on the exhaust duct 62 and, via the exhaust duct 62, on the interior of the dryer tower 40, has the additional benefit of lowering the pressure in the tower 40. This is beneficial to the drying process because it accelerates the evaporation of water from the granules as they flow through the tower 40.

The spiral path 52 followed by the fluidized stream of granules from the inlet 50 towards the base of the tower 40 runs through the annular cavity 56 defined between the core 54 and the outer wall of the tower 40. A continuous baffle 64 spirals downwardly through the annular cavity 56, and is of the same width as the annular cavity 56, so that it extends radially from the outer surface of the core 54 to the inner surface all of the tower 40, whereby an enclosed spiral path 52 is defined by the baffle 64, the central core 54, and the top portion 44 of the tower 40. The spiral baffle 64 starts adjacent the inlet 50 to the tower 40 and terminates at the lower end of the top portion 44 of the tower, to define an exit from the spiral path, from where the granules are discharged to the bottom portion 46 of the tower 40. The spiral baffle 64, tower 40 and central core 54 cooperatively define an elongate duct formed along a spiral path.

The spiral baffle 64 has a pitch that increases in the downward direction, so that the cross-sectional area of the spiral path 52 through which the fluidized stream of granules flows increases, preferably linearly, in the direction of flow. In the exemplary embodiment described here, the spiral baffle 64 is formed from a series of joined, split annular baffles.

In use, a fluidized stream of wet granules, in this case wet granules carried in a hot air stream, enters the inlet 50 at the top end 42 of the dryer tower 40 and proceeds downwardly along the expanding spiral path 52. As the granules flow along the spiral path 52 they give up moisture to the hot air and are thus dried. As the moisture evaporates from the granules it is entrained as vapor in the hot air stream, and thus results in a volumetric increase of the air stream. Preferably, the rate of expansion of the spiral path 52 in the downward direction is selected to accommodate this volumetric increase, in order to substantially avoid any compression of the air stream resulting from moisture evaporation. It is desirable to avoid this compression, because the resulting increased pressure would slow the evaporation of moisture from the granules, and thus be detrimental to the efficiency of the drying process.

When the granules reach the exit from the spiral path 52 at the transition between the top portion 44 and bottom portion 46 of the tower 40, they have a significant velocity component in a tangential direction of the tower 40. Consequently, the granules tend to spiral down the conical inner surface 66 of the tower 40 in the bottom portion 46, in a cyclonic-type manner, to the bottom of the tower 40, which serves as a collection chamber 68 for the dry granules. Meanwhile, the by now warm, moist air is drawn upwardly, under the influence of the vacuum pump 18 attached to the air exhaust 16, through the openings 60 in the conical projection at the bottom of the central core 54, up through the core 54 and out of the exhaust 16. In this way, the warm, moist air is separated from the dry granules.

The cyclonic-type motion of the granules in the bottom portion 46 of the dryer tower 40 discourages them from traveling up through the central core 54. However, in order to substantially prevent granules which break away from the cyclone from being carried out through the air exhaust 16, a filter 70 is placed in the flow path between the lower portion 46 of the tower 40 and the air exhaust 16. In the example illustrated, a cylindrical filter element 72 is used which extends vertically and coaxially within the core 54. The bottom end of the filter 70 is closed and the top end of the filter 70 is sealed around the exhaust 16. Thus, the only flow path from the lower end of the core 54 to the exhaust 16 is through the cylindrical filter element 72. As best seen in FIG. 3, the preferred filter element has a pleated concertina-type form, constructed from a porous fabric or paper, but any of a number of different filters may be used in its place.

Although the cyclonic-type flow of the granules in the lower portion 46 of the dryer tower 40 means that very few granules are typically drawn up into the central core 54, it is possible that, over time, the filter element 72 will start to become clogged and thus reduce the efficiency of the dryer. It is desirable to be able to detect the clogging of the filter element 72, and for this reason a differential pressure gauge 74 is suitably connected across the exhaust 18 and the central core 43 radially outwardly of the filter element 72, to detect the pressure drop across the filter element 72. As the filter element 72 becomes clogged, the pressure drop across the element 72 will increase. This increase in pressure drop can be monitored, and the filter 70 can be replaced once the pressure drop exceeds a predetermined level which has been established as corresponding to an undesirable level of clogging of the filter element 72. It is particularly preferred that the replacement of the filter 70 be facilitated by constructing the tower to have a removable top cover 76, normally sealed closed to the upper edge of the top portion 44. To replace the filter, the top cover 76 is lifted free of the tower 40, exposing the filter 70, which can then simply be lifted out and cleaned, or replaced with a fresh filter 70.

The dry granules are discharged from the collection chamber 68 at the base of the dryer tower 40 through a discharge valve 14. Any of a number of suitable valves may be used, but preferably the valve 14 maintains a seal between the interior of the dryer tower 40 and discharge outlet 78, in order that the desired negative pressure can be maintained in the dryer tower 40. For example, one suitable form of valve is a rotary valve 14, in which a rotor rotates within a barrel, the rotor defining a series of radial pockets, separated by radial rotor arms which seal against the inside of the barrel. The pockets transfer granules from the base of the dryer tower 40 to the discharge outlet 78 while at all times maintaining a seal between two of the rotor arms and the barrel of the valve 14 to avoid any direct passages through the valve 14.

Figure 4:
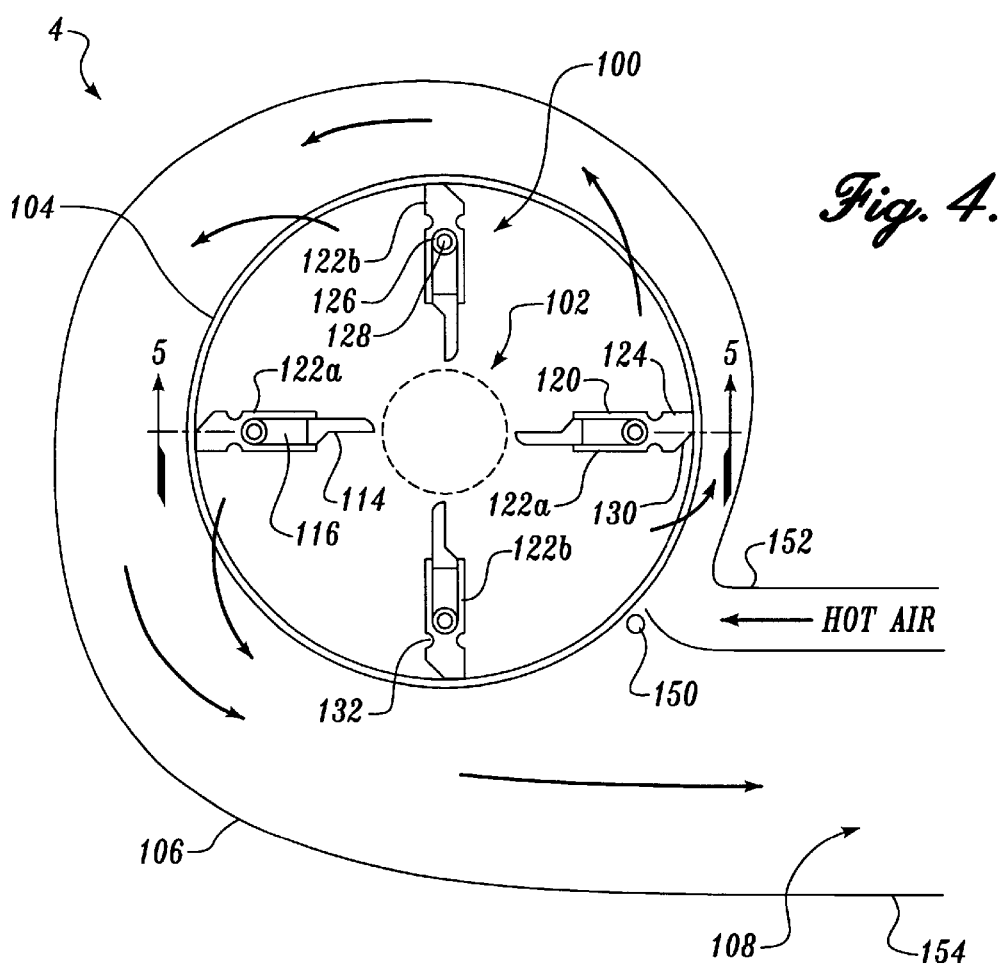
FIG. 4 is a schematic cross-sectional plan view of the agglomerator of FIG. 1 sectioned along a radial plane.
Figure 5:
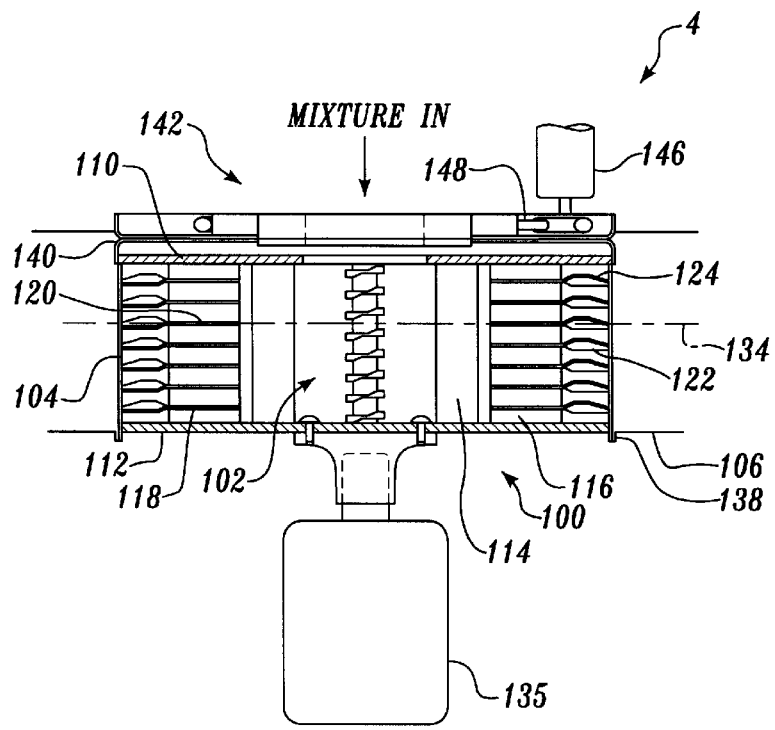
FIG. 5 is a schematic cross-sectional side view of the agglomerator of FIG. 4, sectioned on 5—5.

Referring now to FIGS. 4 and 5, the agglomerator 4 of FIG. 1 is described in greater detail. The principal components of the agglomerator 4 are a rotary blade assembly 100, mounted rotatably about a vertically extending central, open hub region 102, a circular, mesh screen 104, circumferentially surrounding the blade assembly 100, and a volute manifold 106 surrounding the mesh screen, for collecting and directing granules towards an outlet 108 from the agglomerator 4. The mesh screen can suitably be diamond or carbide coated for improved wear resistance.

The rotary blade assembly 100 includes top and bottom, circular support plates 110, 112 which are rigidly joined to one another, and spaced apart from one another by four support columns 114 equally spaced, in the circumferential direction, about the central, open hub region 102. Each column 114 has an elongate cross section (seen in FIG. 4) extending radially outwardly from the hub region 102 towards the mesh screen 104. A vertical array of horizontal slots 118 is formed in a radially outer portion 116 of each column 114. Each slot 118 receives a base 120 of a respective blade 122. As seen most clearly in FIG. 4, blades 122 are received in the slots 118 in the columns 114, the base 120 of each blade 122 being held in a respective slot 118 and a radially outer tip portion 124 of each blade 122 protruding radially outwardly beyond the respective column 114. When received in the slots 118 in the columns 114, as seen in FIGS. 4 and 5, the blades 122 are arranged in a vertically stacked series of circumferential arrays, in the example shown there being four blades 122 in each of seven circumferential arrays. However, there may be more or less blades 122 in each circumferential array, and more or less circumferential arrays in the blade assembly 100.

The columns 114 each have a vertical bore 126 extending from top to bottom, and the root 120 of each blade 122 has a corresponding aperture. To secure the blades 122 in position, they are first slotted into the column 114 and then a pin 128 is dropped into the bore 126 of the column 114, passing through the aperture of each blade 122 to hold it in place. This relatively simple blade retention mechanism allows for a quick and easy replacement of worn blades. Alternative blade retention mechanisms such as welding or set screws, may be used if desired. The blades 122 can suitably be diamond or carbide coated for improved wear resistance.

Each blade 122 has a plate-like form, having the radially inward base 120 that is received horizontally in a respective slot 118 in a respective support column 114, and the radially outer tip portion 124 bearing a cutting edge 130, which in use faces the direction of rotation. Between the base 120 and the tip portion 124 of the blade 122, there is a narrowed neck 132. The neck 132 is provided to facilitate twisting of the tip portion 124 relative to the root 120, as will be explained below.

The radially outer tip portion 124 of each blade 122 is twisted about a radial axis, so that the tip portion 124 is angled relative to the horizontal plane 134 in which the blade 122 and the others in the respective circumferential array rotate about the hub region 102. The direction in which the blade tip portion 124 is twisted relative to the horizontal plane alternates from one blade 122 to the next around each circumferential array. Thus, the two blades 122a opposite one another to the left- and right-hand sides of FIG. 4 are twisted so that their cutting edges 130 are below the horizontal plane of rotation 134, whereas the two blades 122b opposite one another towards the top and bottom of FIG. 4 are rotated such that their cutting edges 130 are above the horizontal plane of rotation 134. When the agglomerator is operated, material that is introduced into the rotary blade assembly 100 through a central aperture in the top support plate 10 into the open hub 102 is forced outwardly by centrifugal force and then impacted by the blades 122. Because of the alternating angled tip portions 124 of the blades 122, the material is pushed first upwardly and then downwardly, imparting to it a generally sinusoidal-type motion. This increased agitation of the material being agglomerated brings a greater volume of the material into contact with each blade 122, and thus increases the efficiency of the agglomerating process.

The rotary blade assembly is driven by a primary motor 135 (FIG. 5), which in the present example is connected directly to the bottom support plate 112 of the blade assembly 100. Alternatively, the primary motor 135, or other drive means, may drive the blade assembly through a drive mechanism employing belts, gears and/or other drive elements. The primary motor 135 typically drives the blade assembly at a speed of about 1800–10,000 rpm.

Figure 6:
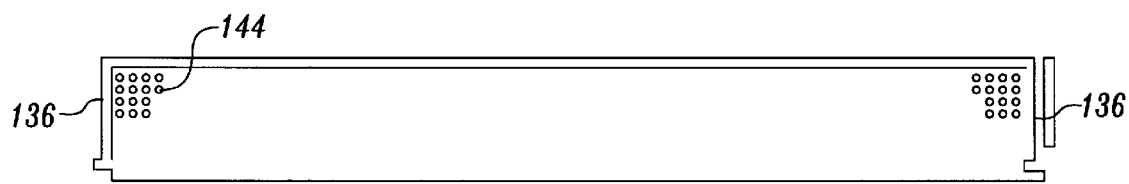
FIG. 6 illustrates an unfolded mesh screen used in the agglomerator of FIG. 4.

The mesh screen 104 is suitably formed from a flat, elongate, rectangular screen, seen in FIG. 6, which is wrapped around the periphery of the rotary blade assembly 100, and its ends 136 are secured together to form the desired, continuous circular screen 104. As seen in FIG. 5, the lower edge of the screen is received in a channel 138 formed in a base wall of the manifold 106, radially outwardly of the lower support plate 112 of the blade assembly 100. For reasons explained below, the screen 104 is free to rotate around its central axis within this channel 138. The upper edge of the mesh screen 104 is attached to an inverted dish shape support element 140, which itself is attached to a hub assembly 142 rotatable relative to the manifold 106 and the rotary blade assembly 100. The mesh screen is formed with a two-dimensional array of through openings 144 (only a small number of which are illustrated in FIG. 6), the size of these openings 144 corresponding to the largest desired size of granule. A set of such mesh screens may be provided for the agglomerator 4, having a variety of different opening sizes, so that an appropriate mesh screen 104 can be selected for the size of granule desired. Advantageously, the size of granule to be produced can be controlled simply by selecting this one component.

In addition to the primary motor 135, an auxiliary motor 146 is suitably provided to slowly rotate the mesh screen 104 about the hub assembly 142, typically at a rate of about 1 rpm. Here, a belt drive 148 is used to give the desired step down in speed from the motor 146 to the hub assembly 142. Preferably, the screen 104 corotates (but at a much lower speed), with the rotary blade assembly 100, because counter-rotation would result in a greater shear force applied to the screen 104 by the material being agglomerated.

The mesh screen 104 is rotated in order to periodically traverse the entire circumference of the screen 104 in front of a screen cleaning device 150 (see FIG. 4), which in the present example is a vertically extending compressed air gallery disposed adjacent, but radially outwardly of the mesh screen 104, and having a vertical series of jets, which direct compressed air against the screen 104 to blow out impacted material from the mesh openings 144.

In use, a dough mixture of the desired powder formulation and water is fed, in the present example by the auger 10, into the central, open hub 102 of the rotary blade assembly 100. From there the dough is thrown radially outwardly into the path of the rapidly rotating blades 122 and, as explained above, forced to follow a generally sinusoidal path as the blades 122 repeatedly impact the material and cut it down into smaller granules. As the material is fed into the hub 102 and rapidly thrown outwardly, there is a tendency for a negative pressure to develop at the hub 102. To counter this, a supply of air is preferably pumped into the hub 102 to negate this naturally occurring negative pressure and preferably is regulated to provide a net positive pressure in the hub 102 to further enhance the radially outward flow of material. This air supply is provided by the pump 20 in FIG. 1.

Once the material has been agglomerated for a period of time, granules of a size small enough to pass through the openings 144 in the mesh screen 104 are developed and pass outwardly through the screen 104 into the manifold 106. To carry the granules along the manifold 106 from where they pass through the mesh screen 104 to the agglomerator outlet 8, a flow of air is introduced at the inlet end 152 of the manifold 106, under positive pressure if desired, and a vacuum is drawn on the outlet end 154 of the manifold 106. This vacuum may be that arising as a result of the outlet 108 from the agglomerator 106 connecting to the inlet 50 of the dryer 12 which has a vacuum drawn on its air exhaust 16. Alternatively, an additional vacuum pump may be used.

In the preferred embodiment, the air flowing through the manifold is heated prior to introduction to the manifold 106, by the heater 26 in FIG. 1. As the granules pass through the mesh screen 104 into this hot air flow, the outer surface of each granule is rapidly dried, forming a surface crust, and helping to prevent the granules from re-combining with one another.

The mixer and other components of the system illustrated in FIG. 1, including the feeder head, the air filter and heater, the pumps, valve and controllers, can be any of a number of suitable components, examples of which are known in the art. Similarly, the various components of the system can be made of any of a number of suitable materials, many examples of which will be readily known to those skilled in the art. Optionally, the materials used can be selected to be appropriate for use in sterile environments, such as for the manufacturer of pharmaceuticals and food-stuff, and may for example be stainless steels or sterilizable plastics such as UHMW Polyethylene.

An overall procedure for operation of the system of FIG. 1 is now summarized. First, the desired formulation of powder, or other particulate material, and a binder such as water, are loaded into the mixer 2, where they are mixed to the consistency of a dough, typically with a moisture content of about 23%–25% by weight. Advantageously, the mixer may be selected to provide a continuous flow of mixture to the agglomerator 4, or a number of batch-type mixers may be used that between them provide a pseudo-continuous flow to the agglomerator 4 in order that the remainder of the process may be operated in a continuous manner. Furthermore, because the mixture is initially mixed to a dough, a very even distribution of the particulate material is possible. This in turn means that the system can be readily used for multiple component formulations, for example, including up to 12 components or more.

From the mixer, the dough is loaded into the feeder head 6 of the agglomerator 4, and the auger 10 feeds the material into the rotary blade assembly 100 of the agglomerator 4. The dough is then broken down into small granules which pass radially outwardly through the mesh screen 104 into the manifold 106. The wet granules are then carried in a hot air stream in the manifold 106 to the agglomerator outlet 108 and onto the dryer inlet 50. The agglomerating process, and in particular the use of a hot air stream in the manifold, begins to dry the granules. Additionally, on the way to the dryer inlet 50, a further stream of hot air having a temperature of about 160° F. or higher, optionally as high as 250° F., is combined with the wet granules to enhance the drying process. At the dryer inlet, the moisture content of the granules will suitably be about 18% by weight. The air stream and the granules proceed through the downwardly spiraling path in the dryer 12 to the bottom portion 46 of the dryer tower 40 where the dry granules are collected and discharged suitably at a moisture content of about 7%–8% by weight. The warm, moist air is drawn back up through the central core 54 of the dryer tower 40 and exhausted through the air exhaust 16. The granules can be collected as they are discharged from the dryer tower 40 and subjected to further processes if desired, for example, sifting, quality checking and/or packaging processes.

Advantageously, the system and/or its various components can be operated in a continuous production manner, or alternatively, a batch production manner; the quantity of material passing through the system has been found to have no effect on the quality of the end product. Furthermore, since the heat supply to the system need not be as high as prior art systems, the system is particularly efficient or may also be used to make granules including heat-sensitive and biological ingredients that may be damaged by the very high temperatures that exist in the prior art systems.

The Agglomeration System of the preferred embodiment uses a damp agglomeration approach starting with mixing the powder and liquids. This is done in a separate PLC-controlled mixer with a unique mixing and cutting blade system. The mixed formula then goes through the size reduction process with a second set of cutting heads. As the newly formed granules exit this stage they are transported through an intermediate heater into a vacuum dryer. The granules are then preferably deposited into a finished goods bin through a unique vacuum valve depositor.

The system is very energy efficient and preferably extremely compact. Two 500 lb. machines can be placed in a 10×10 foot room with an eight foot ceiling. The only connections required are a moisture exhaust and electric power. Although only a small portion of product is in the machine at any time, the yield is equal to batch production processes since the machine handles the product in a continuous stream. The finished product from the Agglomeration System of the present invention is 100% usable. The Agglomeration System lowers costs significantly in initial installation, space, energy consumption and labor versus all other comparable systems currently available on the market. The Agglomeration System of the present invention can produce complex powder and liquid formulas in small and large batches. Commercial agglomeration equipment available to date cannot make that claim.

These systems will be available in differing sizes: For example, a 100 lb. per day tabletop laboratory model, a 500 lb. per day model, and a 2000 lb. per day mid sized production model. The Agglomeration System is designed to allow for great repeatability, control, and flexibility. The present invention provides any level of production capability required, suitably in 2000 lb. increments. This gives the manufacturer a flexible system that can be committed to large batch production or several smaller production projects.

While the preferred embodiment of the invention has been illustrated and described, it will be appreciated that various changes can be made therein without departing from the spirit and scope of the invention. For instance, the preferred embodiment has been described as comprising both the agglomerator 4 and the dryer 12 of the present invention, but these components are also independently useful. In particular, the dryer 12 may be used to dry granules, or other particulate material, formed by any of a number of processes, such as those known in the prior art. On the other hand, granules formed in the agglomerator 4 of the present invention can be dried in apparatus other than the dryer tower 12 described, such as dryer apparatus known in the prior art. Also, as an alternative to, or in addition to employing heated gas streams to facilitate the drying of the granules, dry streams of gas, e.g., air or nitrogen may be used for the same purpose.

Figure 7:
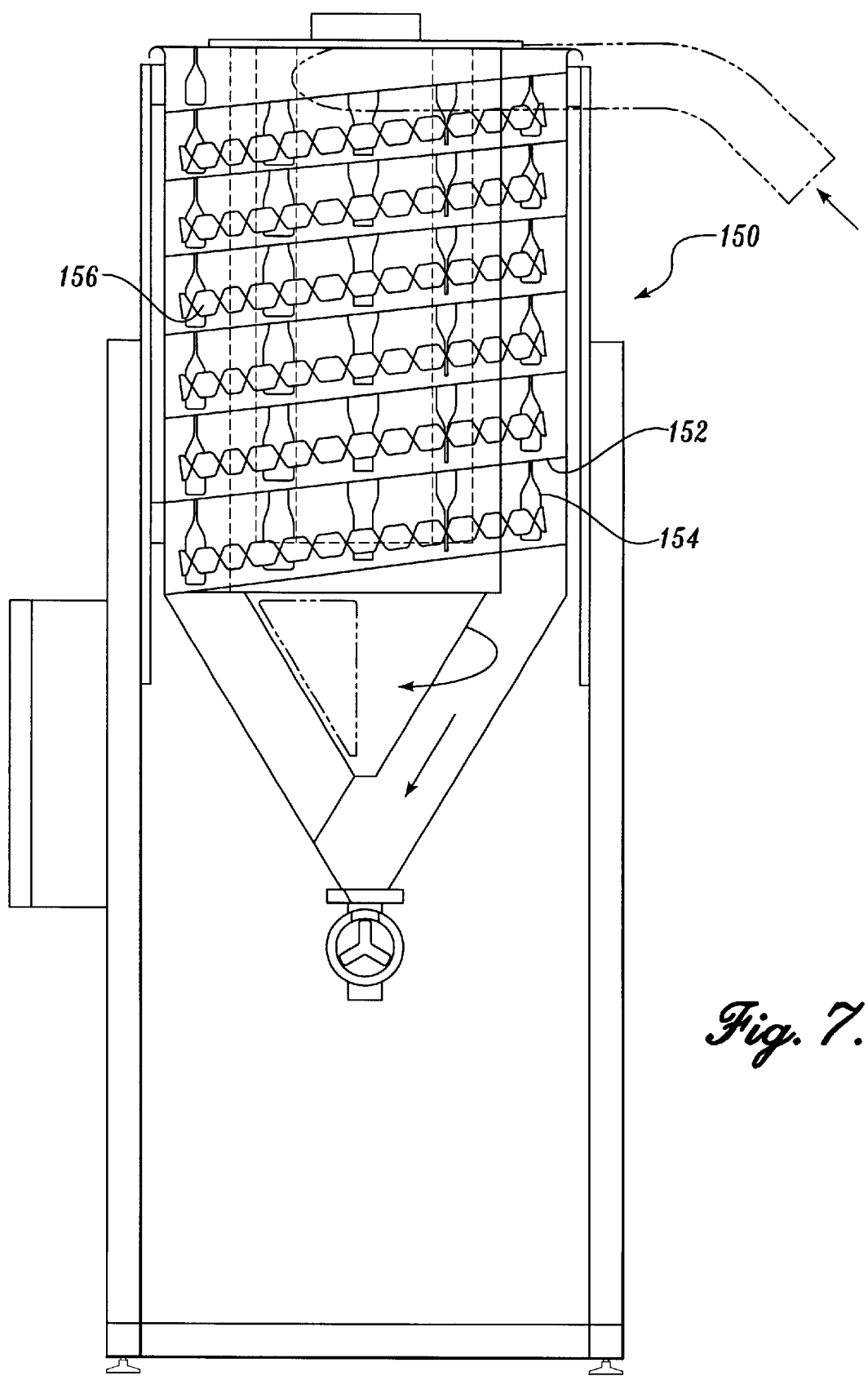
FIG. 7 provides a longitudinal cross sectional schematic of an alternate dryer arrangement.

As a further example of an alteration that can be made in accordance with the present invention, FIG. 7 illustrates an alternative embodiment of the dryer of FIGS. 1 and 2. Rather than a smooth spiral baffle 64 included in the dryer 12 of FIGS. 1 and 2, the dryer 150 of FIG. 7 includes a spiral baffle 152 on which are carried a plurality of longitudinally oriented vanes 154. The vanes 154 induce turbulence into the air stream as it flows down the spiral path of the dryer 150, thereby increasing the speed and efficiency of drying.

The vanes 154 are arranged in a spaced series about the perimeter of the dryer and depend downwardly from the lower surface of the baffle 152. The free ends of the vanes 154, which project into the annular space between flutes of the baffle, are twisted so as to be radially oriented. A helically twisted air flow interrupter 156 is mounted across the ends of the vanes 154, and thus defines a spiral configuration disposed within the annular spiral air flow passage. The radial width and longitudinal height of the interrupter 156 is less than the corresponding dimensions of the passage between the flutes of the spiral baffle 152, so that air and granules pass by the interrupter 156, but are caused to flow in a turbulent manner. The vanes 154 and interrupter 156 present a plurality of flow interrupting surfaces, each oriented at an angle relative to the proximate surface of the spiral baffle 152, to induce turbulence in the fluidized stream. As an alternative to introducing vanes on the spiral baffle 152, the surface of the baffle 152 could instead be formed with a series of corrugations, achieving the same sort of effect. However, vanes 154 and/or flow interrupter 156 are preferred because this increases the turbulence of the air stream.

Figure 8:
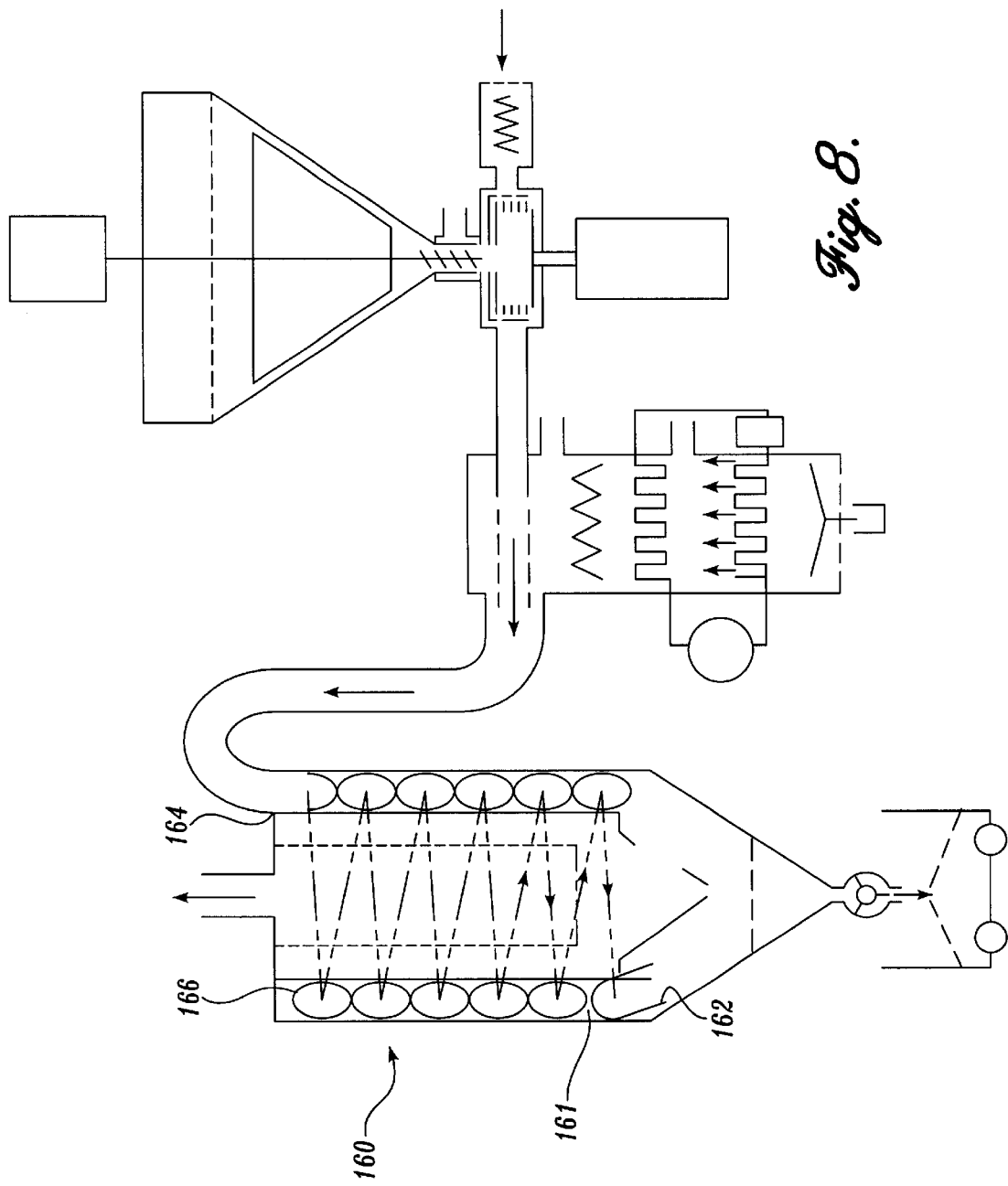
FIG. 8 provides a longitudinal cross-sectional schematic of a further alternate dryer arrangement.
Figure 9:
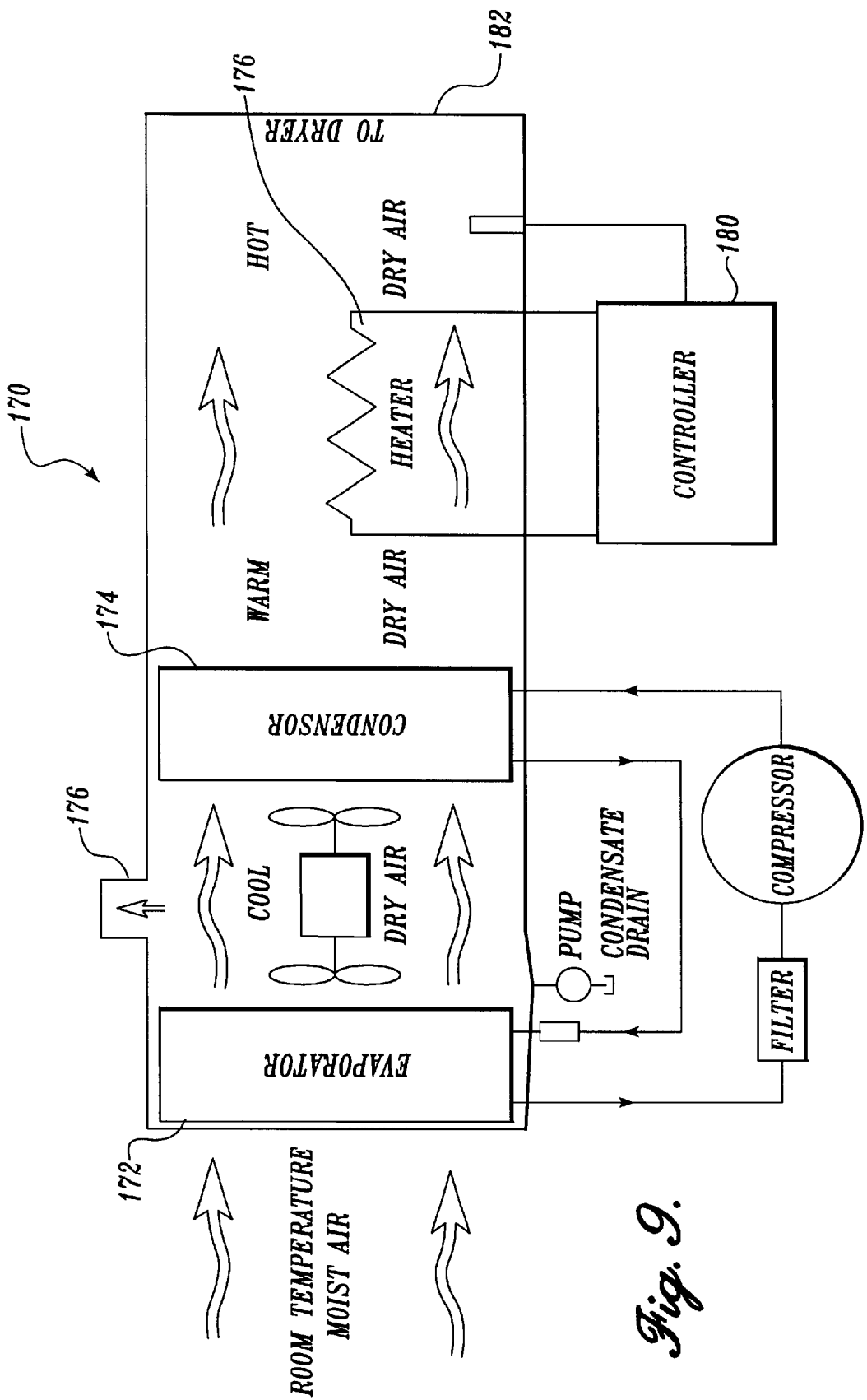
FIG. 9 provides a schematic diagram of an air dryer suitable for use with the system of FIG. 1.

FIG. 8 provides an illustration of an alternative granulation and drying system including an alternate embodiment of a dryer 160. The dryer 160 is configured the same as the previously described dryer 12 in FIG. 2, with the exception of the way in which the spiral flow path is formed between the inner dryer wall 54 and the outer dryer wall 40. Rather than including a spiral, annular baffle 64, the dryer 160 includes a spiral coiled hose 161. The hose 161 has an inlet 164 at the top of the dryer 160, and then coils about on itself around the dryer inner wall, terminating at an outlet 162 to the lower portion of the dryer. In the embodiment illustrated, the cross-sectional area of the hose 161 interior is uniform along the length of the hose. However, it should be readily apparent that, in accordance with the teachings of the present invention disclosed above, the cross-sectional area of the dryer hose 161 can be varied along its length, increasing periodically by joining differing segments of hose having increasing diameters.

The spiral hose 161 preferably is formed from an elastic or elastomeric polymer material that is capable of flexing as the hose is coiled during manufacture, and that will withstand operating temperatures of the dryer 160. Preferably, the hose 161 is reinforced with a conductive metal wire 166. The conductive metal wire 166 is wrapped in a spiral fashion about the hose 161, extending in a spiral along the full length of the hose 161. While the wire 166 can be applied externally or internally to the hose 161, it is preferably integrally formed within the thickness of the wall of the hose 161. In the preferred embodiment the reinforcing wire 166 is formed from spring steel, but alternative electrically conductive and resistance metals or materials such as carbon could be utilized.

In a preferred embodiment, electrical current is supplied to the reinforcing wire 166, creating heat due to the resistance of the wire. For example, a suitable dryer 160 can include a 46 foot length of a four-inch diameter hose that is reinforced with a spiral reinforcing spring 166 that has a 28 ohm resistance. Application of 240 volts across this spring generates 2060 watts, or approximately 45 watts per foot (all dimensions exemplary only) of hose 161. Application of heat to the reinforcing wire 166 enables the hose 161 to maintain the temperature of the granules as they flow in the air stream through the hose 161. This uniform heating along the length of the hose makes up for lost heat due to evaporative cooling.

Other methods of applying heat to the length of the spiral path could be used in place of the heated wire, such as a heat jacket, but the spiral wire is preferred due to uniform heat distribution. An advantage of applying heat along the length of the spiral path is that the dryer inlet temperature can be set at a lower point, which may be important for heat-sensitive materials such as biological materials.

The system of FIGS. 1–6 may also be augmented with a dryer that reduces the moisture content of warm air that is supplied to the dryer 12 (or the dryer 150). Reduced moisture content air may be desirable in many instances including: when the material to be agglomerated is sensitive to temperature and cannot be heated to greater than 160° F. without losing desirable properties; when the glass transition temperature of the material is too low, so that it would become gummy at temperatures above 160° F., such as glutinous, sugary or protein based materials; when the incipient moisture content of the material to be agglomerated is too high; when the ambient air available for use in the system has too high of a moisture content or relative humidity; and combinations of above. Suitable dryers for use in drying air before being supplied to the dryer 12 or 150 can be variously configured.

For example, a dryer can use a refrigeration cycle, in which the air passes through evaporation coils to remove moisture and reduce the temperature, followed by passage through condenser coils to reheat the air prior to introduction to the dryer. For example, running ambient air through evaporator coils at 34° F. to remove moisture and reduce temperature and dew point to 35° F., followed by running this dry air through condenser coils to reheat the air to about 90° F., which is then reintroduced into a preheater, results in relative humidity of less than 2%. This 160° F. dry air is well-suited for use in the dryer.

FIG. 9 provides an illustration of one suitable arrangement of an air dryer for use with the present invention. The dryer 170 includes an evaporator 172 into which moist ambient air is drawn. Cool dry air from the evaporator 172 then passes into a condenser 174. Additionally, a portion of the cool dry air is removed from the dryer 170 through a port 176 to be supplied to the granulator 4, which may be desirable to overcome the heat caused by friction of the cutter blades. The portion of cool dry air passing through the condenser 174 exits as warm dry air, which is further heated by a heater 176 operating under a controller 180, then exits through a port 182 to the dryer 12.

Other forms of moisture control systems may also be incorporated into the present invention. For example, it is important in tabletizing to control the moisture content of granules produced by the agglomerator. This prevents the granules from sticking to the dies, allows better flows, and reduces the amount of binding materials required. The system of the present invention can be adapted to include a chilled mirror dew point sensor and an adaptive feedback control system, to monitor and control the moisture content of the finished agglomerated product. Just before the product exits through the rotary gate valve 14, air surrounding the product is aspirated and blown over the chilled mirror of the dew point sensor. The signal from the sensor is compared to a set point, and a correction is made to the drying air temperature. Another temperature measurement is taken at a predetermined period of time later, usually 10–60 seconds, to verify that the correct adjustment was made.

As a further addition to the system of the present invention, a vacuum aspirator can be used to draw air through the filter 24. The vacuum level outside the filter is measured and compared to a vacuum set point. A control system maintains a proper differential over the filter.

In a further aspect of the present invention, a method is provided for agglomerating fine powders into uniform granules using a very small amount of water or liquid. It is typically necessary to introduce some water or other liquid into powders during agglomeration to form a uniformly damp and crumbly mixture. However, many organic powders require very little water to come to this state, often less than 0.1% by weight. This is the case, for example, with botanicals such as herbal powder, e.g., kava and Echinacea, or materials with a rosinous or glutinous nature. If excess water is utilized, the mixture turns into a glue-like mass which cannot be used in the agglomeration process. However, it is very difficult to uniformly distribute such a small amount of water. One can utilize a fine mist of water sprayed onto the powder, but the particles on the top surface of the powder tend to grab the water droplets and form gummy balls, which then clump into large masses, preventing the rest of the powder mixture from receiving any moisture at all.

Other granulation difficulties are presented when mixing multiple powdered ingredients have different affinities for water droplets. Powders with lower surface tension tend to grab the water droplets, while the remaining powders do not receive any water, thus selectively separating the mixture.

In accordance with a further aspect of the present invention, a method is provided for incorporating very small amounts of water into a powder or powder mixture with uniform water distribution. The method entails chilling the powder, and then mixing the powder while injecting steam (or other evaporated solvent) into the powder. The steam then uniformly condenses onto the powder, for even distribution of the small quantity of water.

Initially, the powders to be agglomerated are chilled to temperature low enough to cause water condensation, but not to be detrimental to the powder mixture, typically 32° F. or less. The powders are agitated vigorously in a mixer, thereby exposing all surfaces of the powder particulates to steam. Steam is then introduced into the agitated powders, and condenses onto the powders. The steam tends to condense selectively only on exposed cold particles. If steam has already condensed onto a particle, the heat of condensation raises the temperature of the particle, thereby avoiding further condensation. Thus, with this method it is possible to mix very small amounts of water or other solvent uniformly into a powder mixture without forming clumps.

While this process has been described for use with steam, any liquid that can be evaporated and condensed, and which does not negatively affect the active ingredients in the mixture can be utilized. One further advantage to this invention is that the temperature of the mixture never exceeds room temperature, thus preserving the efficacy and quality of temperature sensitive materials included in the agglomerated mixture.

Figure 10:
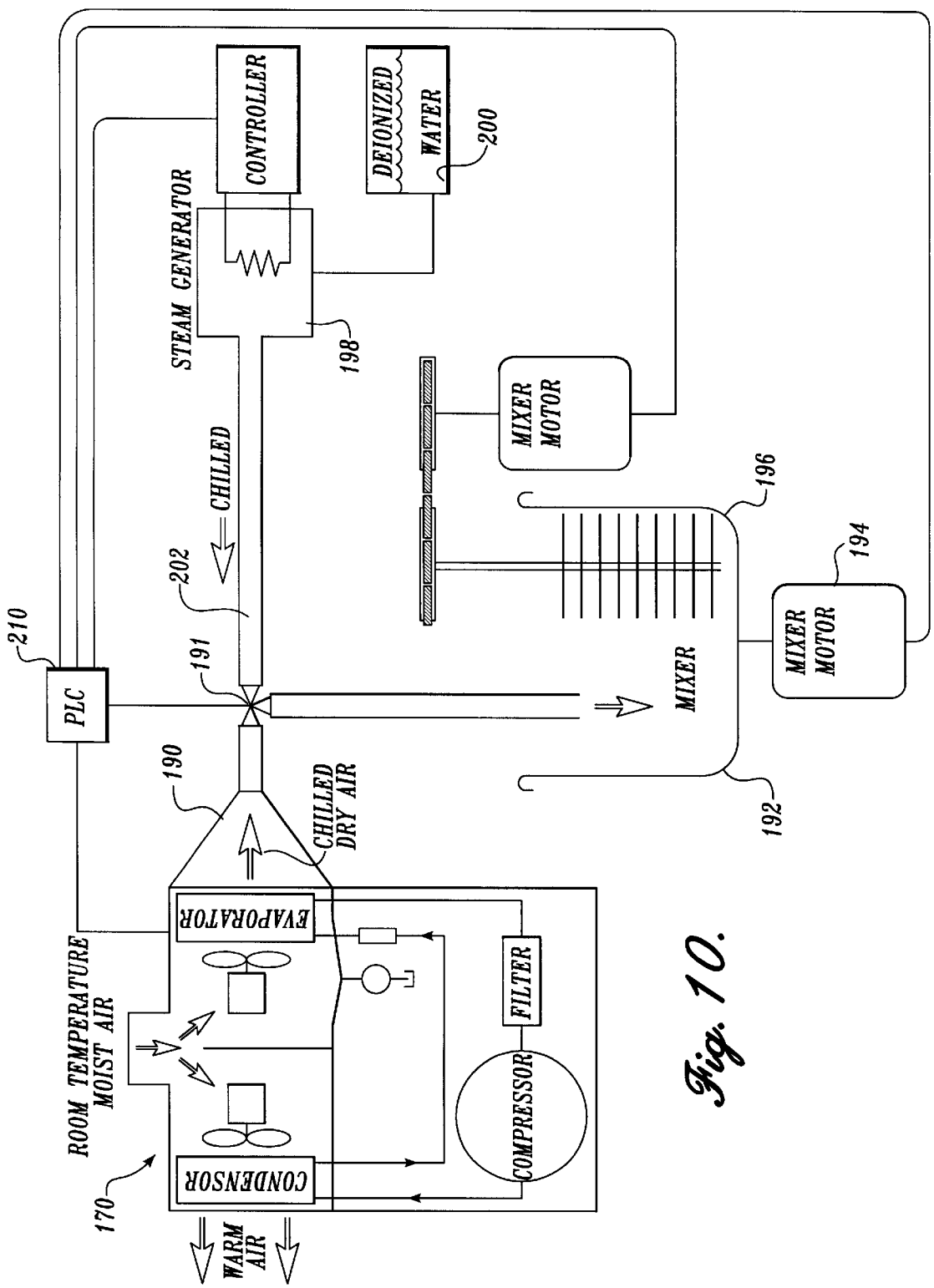
FIG. 10 provides a schematic diagram of a chill and steam embodiment of a granulation system constructed in accordance with the present invention.

FIG. 10 provides a schematic diagram of a system incorporating this chilling and steam condensation method of mixing small amounts of water or other liquid into powders. The condenser/evaporator dryer 170 of FIG. 8 is suitably utilized to produce chilled dry air through an outlet 190. The air from the outlet 190 passes through a three-way valve 191 into a mixer 192 in which powders are being mixed. Mixing occurs by rotating the mixing tank with a motor 194, while concurrently running a counter-rotating chopper blade assembly 196. However, alternative chopper assemblies such as the blade assembly 104 (FIG. 4) described previously may be utilized.

Introduction of the chilled air from port 190 into the mixture 192 causes cooling of the powders contained therein. Steam from a steam generator 198, which is supplied with the ionized water from a water supply 200, is then supplied through a port 202 through the three-way valve 191 and introduced into the mixture 192. This results in condensation of the steam onto the mixed powders. Operation of the dryer 170, the steam generator 198 and the three-way valve 191 is controlled by a controller 210. While a batch-type mixer 192 has been illustrated, a continuous type mixer can instead be employed within the scope of the present invention.

With powders that require even less water and powders that are sensitive to vigorous mixings such as glutinous powders, it is preferred to moisturize any excipients first and mix the active powders into the dampened excipients.

While the preferred embodiments and various alternatives of the present invention have been described above, it should be apparent that various other alternatives and modifications can be made, all of which are intended to be included in the invention.

The embodiments of the invention in which an exclusive property or privilege is claimed are defined as follows:

1. A method for agglomerating powdered material using a liquid, comprising:
   chilling the powdered material to below ambient temperature;
   evaporating the liquid at a temperature greater than ambient; and
   introducing the evaporated liquid to the chilled powder material, such that the evaporated liquid condenses uniformly onto the chilled powdered material.

2. The method of claim 1, further comprising agitating the chilled powdered material during the introduction of the evaporated liquid.

3. The method of claim 1, wherein the liquid comprises water and the evaporated liquid comprises steam.

4. The method of claim 1, wherein the powdered material comprises a mixture of multiple powdered materials having differing levels of water affinity.

5. The method of claim 1, wherein the liquid is included at a level of less than 0.1% by weight of the powdered materials.

6. A method of agglomerating powdered material with a liquid having a boiling point, comprising:
   chilling the powdered material to a temperature below the boiling point of the liquid;
   evaporating the liquid by raising the temperature to above the boiling point to produce vapor;
   agitating the chilled powdered material; and
   while agitating the chilled powdered material, introducing the vaporized liquid to the chilled powdered material, whereupon the vaporized liquid condenses onto the chilled powdered material for substantially uniform distribution of the liquid.

7. The method of claim 6, wherein the liquid material comprises steam.

8. The method of claim 6, wherein the powdered material comprises an organic material.

9. The method of claim 6, wherein the liquid comprises water included at a level of less than 0.1% by weight of the powdered material.

10. An apparatus for drying particulate material, the apparatus comprising:
   (a) a drying chamber having an inlet for particulate material conveyed in a fluidized stream, and an outlet for the particulate material having passed through the drying chamber; and
   (b) a baffle fixed within the drying chamber defining a spiral flow path for the fluidized stream of particulate material from the inlet towards the outlet, the spiral flow path having a cross-sectional area increasing in size with distance from the inlet, wherein the baffle carries a plurality of flow interrupting surfaces arranged to induce turbulence in the fluidized stream.

11. The apparatus of claim 10, wherein the interrupting surfaces are disposed at an angle relative to a plane defined by the baffle.

12. The apparatus of claim 11, wherein the flow interrupting surfaces are defined by a plurality of vanes secured to and projecting from the baffle.

13. The apparatus of claim 12, further comprising a spiral flow interrupter secured to the plurality of vanes.

14. An apparatus for drying particulate matter, the apparatus comprising:
   (a) a drying chamber having an inlet for particulate material conveyed in a fluidized stream, and an outlet for the particulate material having passed through the drying chamber;
   (b) a baffle fixed within the drying chamber defining a spiral flow path for the fluidized stream of particulate material from the inlet towards the outlet, wherein the baffle is constructed from a coiled length of conduit; and
   (c) a heat element applied along the length of the conduit for heating the fluidized stream as it passes through the conduit.

15. The apparatus of claim 14, wherein the conduit forming the spiral flow path comprises a length of coiled hose and the heat element comprises a length of electrically conductive and resistive material wrapped about the hose in spiral fashion along the length of the hose.

\* \* \* \* \*

UNITED STATES PATENT AND TRADEMARK OFFICE
CERTIFICATE OF CORRECTION

PATENT NO.   : 6,270,708 B1
DATED        : August 7, 2001
INVENTOR(S)  : I.M. Gurol It is certified that error appears in the above-identified patent and that said Letters Patent is hereby corrected as shown below:

<u>Title page,</u>
Item [73], Assignee: "Tamer" should read -- TAMER --
Item [56], References Cited, U.S. PATENTS, "4,452,661" should read -- 4,454,661 --

Signed and Sealed this

Sixteenth Day of April, 2002

Attest:

JAMES E. ROGAN
*Attesting Officer*          *Director of the United States Patent and Trademark Office*